Oct. 29, 1940.  A. H. HABERSTUMP  2,219,361
ROCKER ARM
Filed May 31, 1938
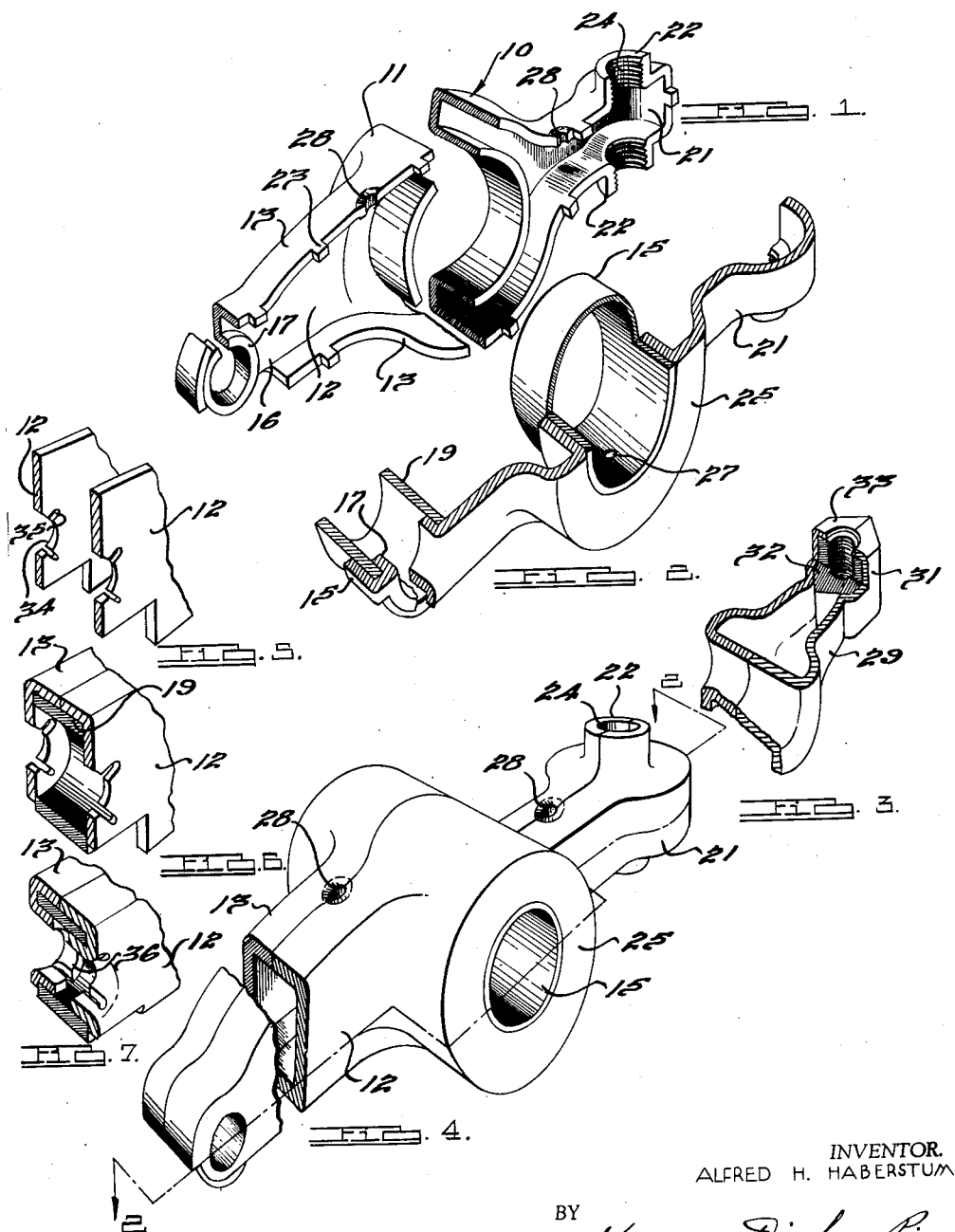
INVENTOR.
ALFRED H. HABERSTUMP
BY Harness, Dickey & Pierce.
ATTORNEYS.

Patented Oct. 29, 1940

2,219,361

UNITED STATES PATENT OFFICE 2,219,361

ROCKER ARM

Alfred H. Haberstump, Detroit, Mich., assignor to The Murray Corporation of America, Detroit, Mich., a corporation of Delaware Application May 31, 1938, Serial No. 210,844

5 Claims. (Cl. 74—519)

My invention relates to fabricated operating arms, and particularly to operating elements having a supporting portion and one or more operating arms projecting therefrom.

Operating arms, such as rocker arms, bell cranks, and the like, have usually been made from strap material or from forgings or castings. Such arms are formed into desired shape, are solid, and of material weight. When strap material is employed, outwardly projecting bosses are provided thereon to support bearings and contacting portions, and in some instances, one or more of the straps are stacked together and welded to provide greater rigidity.

In practicing my invention, I employ thin sheet material, which is preformed into channel shape and constructed right and left handed and disposed to have the channel portions facing each other with the edges of the flanges joined by welding to provide a solid appearing operating arm which is of box section construction. Very light sheet material is employed in constructing such arms, providing the same or greater strength than that of the forged, cast, or other known types of solid arms. The edges of the channel flanges are preferably provided with projections to permit the assembly of the elements by a projection welding operation. It is to be understood that the operating arms may pivot on a shaft or may be fastened, keyed, or otherwise secured thereto and that for the purpose of illustration I have shown a pivoted arm of the rocker type.

It is to be understood further that the arms may be disposed relative to each other at a position other than 180 degrees as illustrated. The rocker type of arm herein illustrated and described as an example, is employed in automotive engines for the purpose of operating the valves from the cam shaft. A cylinder is secured at the extremity of one of the arms to be engaged by the cam surfaces of the shaft, while the opposite extremity of the other arm is threaded to receive the operating element for the valves.

Accordingly, the main objects of my invention are; to construct an operating arm from thin sheet material formed into right and left hand elements which are welded together to provide a box section construction; to form right and left hand elements for rocker arms, bell cranks, and the like, from thin sheet material which is bent into channel form and which are welded together to provide a box section construction; to form right and left hand elements of channel section having projecting aligned bosses from which hollow arms extend when the flanges are welded together; to provide an operating element of box section with a bearing from which one or more arms project; to provide a box section operating element with a shaft receiving boss from which one or more arms project having means at their extremities associated with an operating element; to provide a box section rocker arm for an automotive engine having a central bearing, an arcuate operating surface at the extension of one arm and a threaded portion at the end of the opposite arm, and in general, to provide an operating arm which is of light weight, of box section construction, and which is economical of manufacture.

Other objects and features of novelty of my invention will be either specifically pointed out or will become apparent when referring, for a better understanding of my invention, to the following description taken in conjunction with the accompanying drawing, wherein:

Figure 1 is a broken view of one half of a rocker arm embodying features of my invention;

Fig. 2 is a sectional view of the other half of the rocker arm shown in Fig. 1, taken on the line 2—2 of Fig. 4;

Fig. 3 is a broken sectional view of one arm of an operating element, similar to that illustrated in Fig. 4, showing a modified form thereof;

Fig. 4 is a perspective view partly in section, of a rocker arm embodying features of my invention;

Fig. 5 is a broken sectional view of a rocker arm similar to that illustrated in Fig. 4, showing a modified form thereof;

Fig. 6 is a view of structure, similar to that illustrated in Fig. 5, with an operating cylinder added thereto; and Fig. 7 is a view of structure, similar to that illustrated in Fig. 6, with the operating cylinder secured in place.

Referring to Figs. 1, 2, and 4, a rocker arm 10 is constructed from similar right and left hand elements 11. The elements 11 have a web portion 12 and upstanding sides or flanges 13 providing a channel section. An annular flange 14 forms a boss for receiving a bearing 15 which is disposed on a shaft (not shown) upon which the arm pivots. The operating end 16 of the rocker arm has similar inwardly extending bosses or flanges 17 over which an operating cylinder 19 is disposed to be clamped between the outer flanges 13 and the inwardly extending bosses 17. The flanges 13 are broken away on the underside to provide clearance for the cam which engages the cylinder and forces the arm to rock upon its supporting shaft. The operated end 21 of the rocker arm 10 has vertical outwardly directed bosses 22 which are tapped, after the right and left hand elements of the rocker arm are welded together.

To produce a simplified welding operation, I have illustrated a plurality of projections 23 in extension of the flanges 13 on one of the elements 11 which engage the flanges 13 on the adjacent element. The projections are melted and bonded to the flanges of the elements by a projection welding operation.

Threads 24 are cut in the inner opening of the bosses 22 and operating elements for the valves (not shown) are adjustably secured thereby in the conventional manner. The bearing 15 may be provided with an oil hole 27 to form a passage for the lubricant from the interior of the rocker arm. Oil will collect within the rocker arm from the exterior openings 28 which receive oil from the splash system which is usually employed in connection with such rocker arms. The box section structure provided by the rocker arm provides material strength thereto while materially reducing the weight of the arm which is desirable in view of the rapid movement of the arm in oscillation a material number of times per minute.

In Fig. 3, I have illustrated the operating end 29 of the rocker arm shown in Fig. 3 as having a hexagonally shaped housing 31 in which a hexagonal nut 32 is supported against turning movement. After assembling the two elements 11 and the nuts, the top flange 33 may be bent over the nut to prevent the axial movement thereof. This is an optional construction which may be substituted for that illustrated in Figs. 1, 2, and 4, wherein the material is extended to form bosses 22 which are thereafter threaded.

In Figs. 5, 6, and 7, I have illustrated a further method of securing the cylinder 19 to the arm 16. The webs 12 have openings 34 therein which are slotted at 35 and between which the cylinder 19 is disposed. The material about the openings 34 between the slots 35 are readily bent inwardly to form internal bosses or holding means 36 for the cylinder which are similar to the boss 17 above referred to with regard to the structure illustrated in Figs. 1, 2, and 4. This arrangement eliminates the forming of the material into the bosses 17 and permits the assembly of the cylinder 19 after the two elements 11 are welded together. In the structure illustrated in Figs. 1, 2, and 4 the cylinder 19 is assembled before the welding operation.

While I have described specifically a rocker arm for automotive engines, it is to be understood that any type of arm, either single or having a multiple number of arms, such as bell cranks and the like, may be constructed in a similar manner. Such arms may have openings at the ends which provide an eye for receiving a link or other operating element and may be otherwise formed, following the teaching of similar solid arms which are well known in the art and utilized for operating an associated element. The arms of the present invention are rugged in construction and appearance but are light in weight, permitting the use of thin gauge material. The operating elements at the end of the arms may be assembled therein during the welding of the arm elements or may be threaded or otherwise attached after assembly to provide connection to the operating means.

While I have described and illustrated several embodiments of my invention, it will be apparent to those skilled in the art, that various changes, omissions, additions and substitutions may be made therein without departing from the spirit and scope of my invention, as set forth in the accompanying claims.

What I claim is:

1. A rocker arm having a central bearing support and extending arms, including right and left hand stampings of channel form with the channel portions and the central bearing support presenting toward each other, the channel portions being welded together at the abutted flanges to form a box section construction.

2. An operating element having a central bearing support and extending arms, including, like stampings of channel form and of the opposite hand with the central bearing support projected inwardly between the flanges of said channel, at least one of said stampings having projections in extension of the channel walls, the channel portions presenting toward each other with the flanges abutting and joined by a projection welding operation through said projections to form a box section construction.

3. An operating arm having a central bearing support and extending arms including like stampings of channel form which are of the opposite hand presenting toward each other and with the bearing support projected inwardly between the flanges of said channel, annular flanges formed in the web of the channel stampings between the ends of the arms, flanges at the ends of said arms, a bearing retained by said annular flanges, and means associated with the flanges at the ends of the arms for supporting operating members.

4. A rocker arm of box construction, comprising two sections each section being of channel shape and joined by welding at the abutted flanges, central bosses extending from the web of said sections between the flanges at the edges thereof, a bearing supported by said bosses, a cylindrical element supported in the end of one of the arms with its axis disposed parallel to the axis of said bearing, and a threaded support near the end of the opposite arm with a plane through its axis disposed substantially at right angles to the axis of said cylinder and bearing.

5. A rocker arm having a central bearing on a shaft through which the arm is rocked, including two like sections of opposite hand and of channel formation welded together into box formation, inwardly disposed flanges centrally of the sections, a bearing secured in said flanges, the webs of the terminal end of one arm being provided with openings, the walls of which are slotted, a cylindrical element disposed between said webs with its axis aligned with the axis of said openings, the wall of the openings between the slotted portion being flanged inwardly to position said cylindrical element, the terminal end of the opposite arm having outwardly disposed flanges which are threaded.

ALFRED H. HABERSTUMP.